Patented Dec. 7, 1948

2,455,790

UNITED STATES PATENT OFFICE 2,455,790

ENTERIC COATINGS

Carl J. Malm and Gordon D. Hiatt, Rochester, N. Y., assignors to Eastman Kodak Company, Rochester, N. Y., a corporation of New Jersey No Drawing. Application June 9, 1945, Serial No. 598,638

9 Claims. (Cl. 167—82)

This invention relates to compositions comprising medicaments coated or surrounded with enteric coatings essentially consisting of a polyvinyl phthalate salt and gelatin in certain proportions such that the coating is substantially soluble in or disintegrated by the intestinal secretions but substantially insoluble in the secretions of the stomach.

Numerous substances have been proposed for use as enteric coatings. Many of these have been difficult to prepare or form into a coating suitable for containing medicaments. Some while unaffected by the stomach secretions are likewise only very slightly affected by the intestinal secretions so that the contained medicament is not released. Some materials which have been proposed depend upon a "time bomb" like action, i. e., they are impervious to solution for a limited time and then they gradually disintegrate. This means that the medicament is released after a given time whether it is in the stomach or not.

This invention has for its object to provide an enteric coating free of the above difficulties. Another object of the invention is to provide an enteric coating for medicaments which is impervious to the action of stomach juices for an indefinite period but which will disintegrate in intestinal fluids. A further object is to provide a composition which may be readily formed into capsules. A still further object is to provide an improved enteric coating comprising gelatin and a water soluble salt of polyvinyl phthalate in proportions such that the composition will set or gel on cooling and will be impervious to gastric juices but will dissolve in intestinal fluids.

We have found that a mixture of water soluble salt of polyvinyl phthalate and gelatin within certain proportions provides a composition which can be readily worked up into capsules or other coatings and will resist disintegration in the stomach for an indefinite period but is immediately disintegrated by intestinal fluids. The useful range of compositions lies between 70 parts of a water soluble salt of polyvinyl phthalate–30 parts gelatin and 50 parts water soluble salt of polyvinyl phthalate–50 parts gelatin.

The phthalate element of our enteric coating composition should be a nontoxic water soluble salt of polyvinyl phthalate, the polyvinyl phthalate portion of which has a phthalyl content of at least 45%. The polyvinyl phthalate may also contain a small proportion of acetyl because of the acetyl contained in the polyvinyl alcohol employed in its preparation. For example, the term "polyvinyl alcohol" is applied to compounds substantially free of acetyl and also to compounds having a small proportion of acetyl (such as up to 15%) therein. The compounds which may be used as the starting material for polyvinyl phthalates may be polyvinyl alcohols (or far hydrolyzed polyvinyl acetates) containing up to 15% combined acetyl, those having viscosities of 5–75 C. P. S. in 4% aqueous solution at 20° C. (the usual viscosities are within this range) being eminently suitable for preparing polyvinyl phthalates, the water soluble salts of which are useful in our invention. The acetyl (or other acyl) content of the polyvinyl phthalate portion of the salt employed in our invention should be less than 10% and preferably less than 5%.

The polyvinyl phthalate, the salt of which is employed, can be prepared with any one of the various methods of preparation known in the art. For instance, this material may be prepared in accordance with the process described and claimed in Salo Patent No. 2,275,685. Another method which has been found to be eminently suitable for preparing polyvinyl phthalate is the treatment of polyvinyl alcohol with the necessary amount of phthalic anhydride and a large proportion of pyridine (U. S. Patent No. 2,023,485). The salts of polyvinyl phthalate are prepared by treating the polyvinyl phthalate which contains carboxyl groups with alkali such as by dissolving in dilute sodium hydroxide or sodium carbonate. Those which are representative of the nontoxic water soluble salts are the alkali metal salts such as sodium, potassium, or lithium, the salts of ammonia or the substituted ammonias or the ethanolamine salts such as of triethanolamine. The purpose of forming the salt of polyvinyl phthalate is to promote water solubility so as to permit use in our invention.

The theory upon which our enteric coatings operate is that the stomach fluids being acid convert the water soluble salts of polyvinyl phthalate to an insoluble acid form and as long as the enteric coating remains in the stomach, the polyvinyl phthalate resists dissolving and also is present in sufficient amount to protect the gelatin against disintegration. When the coating material enters the intestine the polyvinyl phthalate is converted back to a soluble salt form whereupon the coating disintegrates.

Although our invention is directed broadly to the coating of medicaments with enteric coatings, it is particularly directed to forming the enteric coatings into capsules in which the medicaments are contained. The compositions of our invention within the limits stated form compatible and water soluble solutions which set to a gel upon cooling and thus are susceptible to the same manufacturing technique which is standard for the preparation of medical capsules.

The composition employed may be varied, depending on whether a hard or soft type capsule is desired, by excluding or introducing plasticizers into the composition. The use of plasticizers may result in a coating which is less brittle and therefore less liable to crack. This is a particular advantage when relatively large pliable capsules are desired. The plasticizers which are useful in compositions in accordance with our invention are those which are soluble in water and chemically stable and have a sufficiently high boiling point that they will not evaporate from the composition on keeping. Some of the water soluble plasticizers which may be employed are; glycerol, ethylene glycol, sorbitol, mannitol, pentaerythritol and monoacetin. The proportion of plasticizer employed is not critical, its function being merely to exert its softening characteristics upon the product. Thus, if a hard capsule is desired, the proportion of plasticizer present in the composition would be within the range of 0–25%. If a moderately hard skin or capsule is desired, an amount of plasticizer within the range of 25–50% would be desirable. If the skin is desired in limp form or of a somewhat rubbery nature, the plasticizer may be 50–75% or more. These proportions are by weight and based upon the weight of the polyvinyl phthalate salt-gelatine composition. The following examples illustrate our invention:

Example I

One part of a composition consisting of 65 parts of a sodium salt of polyvinyl phthalate which polyvinyl phthalate has a phthalyl content of 60% and an acetyl content of approximately 2% and 35 parts of gelatin, was dissolved in 5 parts of water at 50–60° C. At this temperature capsule elements were formed on small, round-ended tubes by dipping the tubes in the solution, withdrawing the tubes and rotating them to keep the coating even. The coating was set by cooling and the skin was then dried and slipped from the tube to form a half end of a capsule.

Example II

Two parts of a composition consisting of 55 parts of a sodium salt of polyvinyl phthalate which polyvinyl phthalate has a phthalyl content of 55% and an acetyl content of approximately 2% and 45 parts of gelatine, were dissolved in 5 parts of water at 50–60° C. 0.2 parts of glycerol was added to the solution and capsule elements were formed as in the preceding example.

Example III

One part of a composition consisting of 60 parts of a sodium salt of polyvinyl phthalate which polyvinyl phthalate has a phthalyl content of 65% and an acetyl content of 2% and 40 parts of gelatin was dissolved in 5 parts of water at 50–60° C. Capsule elements were formed therefrom by forming on round-ended tubes and cooling followed by drying as described in Example I. These capsule elements were found to be suitable for containing various types of medicaments such as in the form of powder, or in the form of a liquid such as oil which would not disintegrate the capsule.

If desired, instead of forming capsules, the medicaments to be protected, especially in pill form, may be directly dipped into a solution of the composition described herein, dissolved in water. It may then be set by cooling and dried. In some cases it may be desirable to first coat the medicament, powder, or pill with gelatin, or the material may be enclosed in a gelatin capsule and the gelatin coated medicament may then be dipped or otherwise coated using a solution of the composition described herein to form an exterior enteric coating. The thickness of the coatings can be controlled by varying the concentration of the composition in the solvent. If desired, a plurality of layers or coatings may be employed in coating the medicaments. The thickness of the wall of the capsules made from our composition may also be controlled by varying the concentration of the solution of the composition in its solvent. The composition may be formed into capsules composed of telescoping units into which the medicaments can be placed and sealed. If desired however, especially in the case of soft highly plasticized capsules such as employed to contain oil, the composition may be prepared in the form of sheets having numerous indentations therein, uniformly placed, and the soft capsules may be formed by filling in the indentations with the desired liquid and then pressing a second sheet thereon to form the other half of the enclosure and separating the individual units.

The term "medical capsule" as employed herein is to be understood as referring to the surrounding of a medicament by a capsule; the medicament may be in the form of powder, pills, pellets, oil, granules or any other physical form which can be contained by a capsule.

We claim:

1. As a new article of manufacture a medicament surrounded by an enteric film or layer of a composition essentially consisting of 70–50 parts of a nontoxic water soluble salt of a polyvinyl phthalate, which polyvinyl phthalate has a phthalyl content of at least 45%, and 30–50 parts of gelatin, which composition is substantially insoluble in the acid stomach secretions but disintegrated by the alkaline intestinal fluids.

2. As a new article of manufacture a medical capsule made up of a composition essentially consisting of 70–50 parts of a nontoxic water soluble salt of a polyvinyl phthalate, which polyvinyl phthalate has a phthalyl content of at least 45%, and 30–50 parts of gelatin, which capsule is substantially insoluble in the acid stomach secretions but disintegrated by the alkaline intestinal fluids.

3. As a new article of manufacture a medical capsule essentially consisting of a composition of 70–50 parts of a nontoxic water soluble salt of a polyvinyl phthalate, which polyvinyl phthalate has a phthalyl content of at least 45%, and 30–50 parts of gelatin mixed with a plasticizer for the composition, which capsule is substantially insoluble in the acid stomach secretions but disintegrated by the alkaline intestinal fluids.

4. As a new article of manufacture a medicament surrounded by an enteric film or layer of a composition essentially consisting of 70–50 parts of a sodium salt of a polyvinyl phthalate which polyvinyl phthalate has a phthalyl content of at least 45%, and 30–50 parts of gelatin, which composition is substantially insoluble in the acid stomach secretions but disintegrated by the alkaline intestinal fluids.

5. As a new article of manufacture a medical capsule made up of a composition essentially consisting of 70–50 parts of the sodium salt of a polyvinyl phthalate, which polyvinyl phthalate has a phthalyl content of at least 45%, and 30–50 parts of gelatin, which capsule is substantially insoluble in the acid stomach secretions but disintegrated by the alkaline intestinal fluids.

6. As a new article of manufacture a medical capsule made up of a composition essentially consisting of 70–50 parts of a sodium salt of a polyvinyl phthalate, which polyvinyl phthalate has a phthalyl content of at least 45%, and 30–50 parts of gelatin mixed with glycerol as a plasticizer therefore, which capsule is substantially insoluble in the acid stomach secretions but disintegrated by the alkaline intestinal fluids.

7. As a new article of manufacture a medical capsule made up of a composition essentially consisting of 70–50 parts of a nontoxic water soluble salt of a polyvinyl phthalate, which polyvinyl phthalate has a phthalyl content of at least 45%, and 30–50 parts of gelatin, and 50–75% (based on the total composition) of a plasticizer, which capsule is substantially insoluble in the acid stomach secretions but disintegrated by the alkaline intestinal fluids.

8. As a new article of manufacture a medical capsule made up of a composition essentially consisting of 70–50 parts of a nontoxic water soluble salt of a polyvinyl phthalate, which polyvinyl phthalate has a phthalyl content of at least 45%, and 30–50 parts of gelatin mixed with glycerol as a plasticizer for the composition, which capsule is substantially insoluble in the acid stomach secretions but disintegrated by the alkaline intestinal fluids.

9. As a new article of manufacture a medical capsule made up of a composition essentially consisting of 65 parts of a sodium salt of a polyvinyl phthalate, which polyvinyl phthalate has a phthalyl content of at least 45%, and 35 parts of gelatin, which capsule is substantially insoluble in the acid stomach secretions but disintegrated by the alkaline intestinal fluids.

CARL J. MALM.
GORDON D. HIATT.

REFERENCES CITED

The following references are of record in the file of this patent:

UNITED STATES PATENTS

| Number | Name | Date |
| --- | --- | --- |
| 2,066,105 | Hagedorn et al. | Dec. 27, 1936 |
| 2,072,303 | Hermann et al. | Mar. 2, 1937 |
| 2,131,747 | Nadeau | Oct. 4, 1938 |
| 2,275,685 | Salo | Mar. 10, 1942 |
| 2,390,088 | Fox et al. | Dec. 4, 1945 |